(12) United States Patent　　(10) Patent No.:　　US 10,832,039 B2
Sun et al.　　　　　　　　　　　(45) Date of Patent:　　Nov. 10, 2020

(54) FACIAL EXPRESSION DETECTION METHOD, DEVICE AND SYSTEM, FACIAL EXPRESSION DRIVING METHOD, DEVICE AND SYSTEM, AND STORAGE MEDIUM

(71) Applicant: BEIJING KUANGSHI TECHNOLOGY CO., LTD., Beijing (CN)

(72) Inventors: Wei Sun, Beijing (CN); Haoqiang Fan, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 16/147,142

(22) Filed: Sep. 28, 2018

(65) Prior Publication Data

US 2019/0384967 A1　　Dec. 19, 2019

(30) Foreign Application Priority Data

Jun. 19, 2018　(CN) .......................... 2018 1 0629426

(51) Int. Cl.
*G06K 9/00*　　　(2006.01)
*G06N 3/08*　　　(2006.01)

(52) U.S. Cl.
CPC ..... *G06K 9/00302* (2013.01); *G06K 9/00268* (2013.01); *G06K 9/00288* (2013.01); *G06N 3/08* (2013.01)

(58) Field of Classification Search
CPC .......... G06K 9/00302; G06K 9/00288; G06K 9/00268; G06K 9/6273; G06N 3/08; G06N 3/0454

USPC ......................................................... 382/118
See application file for complete search history.

(56) References Cited

U.S. PATENT DOCUMENTS

| 9,818,024 | B2 * | 11/2017 | Bacivarov | .......... G06K 9/00281 |
| 2018/0330178 | A1 * | 11/2018 | el Kaliouby | ....... G06K 9/00302 |
| 2018/0364966 | A1 * | 12/2018 | Valeri | .................. H04R 29/001 |
| 2019/0152492 | A1 * | 5/2019 | el Kaliouby | ............. A61B 5/18 |

OTHER PUBLICATIONS

Li, "Facial expression recognition using deep neural networks," 2015 IEEE International Conference on Imaging Systems and Techniques (IST), Macau, 2015, pp. 1-6.*
Faria, "Interface Framework to Drive an Intelligent Wheelchair Using Facial Expressions" Publisher: IEEE Date of Conference: Jun. 4-7, 2007.*
Graves, "Facial Expression Recognition with Recurrent Neural Networks." 2008.*
Fasel, "Facial expression analysis using shape and motion information extracted by convolutional neural networks " Proceedings of the 12th IEEE Workshop on Neural Networks for Signal Processing Year: 2002.*

* cited by examiner

*Primary Examiner* — Juan A Torres
(74) *Attorney, Agent, or Firm* — Hamre, Schumann, Mueller & Larson, P.C.

(57) ABSTRACT

A facial expression detection method includes: obtaining an image to be processed; inputting the image to be processed into a neural network model to obtain a facial expression parameter of a target face in the image to be processed; and outputting the facial expression parameter of the target face for driving an object to be driven.

19 Claims, 5 Drawing Sheets

FACIAL EXPRESSION DETECTION METHOD, DEVICE AND SYSTEM, FACIAL EXPRESSION DRIVING METHOD, DEVICE AND SYSTEM, AND STORAGE MEDIUM

CROSS-REFERENCE TO RELATED APPLICATION

The present application claims priority of the Chinese Patent Application No. 201810629426.1, filed on Jun. 19, 2018, the disclosure of which is incorporated herein by reference in its entirety as part of the present application.

TECHNICAL FIELD

The present disclosure relates to an image processing field, and more specifically relates to a facial expression detection method, device, system and storage medium, and a facial expression driving method, device, system and storage medium.

BACKGROUND

A facial expression driving system is currently a very popular real-time application. Facial expression driving refers to "a process of performing program analysis to obtain a user's current facial expression, and transferring the facial expression to other object in order to make the other object change accordingly". A simplest example is to drive a cartoon image, such that whatever facial expression the user makes, a cartoon image makes a same facial expression.

An existing facial expression driving technology requires a lot of expensive external devices (for example, a 3D device is needed to capture a facial expression and/or a body motion of an animation), or needs to add a lot of artificial elements, which is not automated enough (for example, some software requires the user to firstly register his/her face, and then the facial expression driving can be performed), or has a complicated computing process, thus the speed is so slow that use is affected.

SUMMARY

The present disclosure is proposed in consideration of the above-mentioned problems. The present disclosure provides a facial expression detection method, device, system and storage medium, and a facial expression driving method, device, system and storage medium.

According to one aspect of the present disclosure, a facial expression detection method is provided. The facial expression detection method comprises: obtaining an image to be processed; inputting the image to be processed into a neural network model to obtain a facial expression parameter of a target face in the image to be processed; and outputting the facial expression parameter of the target face for driving an object to be driven.

Exemplarily, the neural network model is used for fitting a face relation below:

$$V = V\_bar + A\_id * a\_id + A\_exp * a\_exp;$$

where V represents coordinates of a first feature point on a face in an input image input into the neural network model, V_bar represents coordinates of a second feature point on an average face, the second feature point corresponds to the first feature point, a_id and a_exp respectively represent a shape parameter and a facial expression parameter of the face in the input image, A_id and A_exp respectively represent a reference shape displacement related to a shape of the face and a reference facial expression displacement related to a facial expression of the face, and V_bar, A_id and A_exp are preset values, and the input image includes the image to be processed.

Exemplarily, the coordinates of the first feature point are represented by a first set of coordinate values, the coordinates of the second feature point are represented by a second set of coordinate values; coordinate values in the first set of coordinate values are in one-to-one correspondence with coordinate values in the second set of coordinate values; a_id comprises at least one shape coefficient, each of the at least one shape coefficient corresponds to $m_1$ coordinate values in the first set of coordinate values and corresponds to $m_2$ coordinate values in the second set of coordinate values, the $m_2$ coordinate values are in one-to-one correspondence with the $m_1$ coordinate values; and each of the at least one shape coefficient is multiplied by A_id and then added to a corresponding coordinate value in the second set of coordinate values, so as to obtain a corresponding coordinate value in the first set of coordinate values, where $m_1$ and $m_2$ are integers, $1 \leq m_1$ and $m_1 = m_2$.

Exemplarily, the coordinates of the first feature point are represented by a first set of coordinate values, the coordinates of the second feature point are represented by a second set of coordinate values; coordinate values in the first set of coordinate values are in one-to-one correspondence with coordinate values in the second set of coordinate values; a_exp comprises at least one facial expression coefficient, and each of the at least one facial expression coefficient corresponds to $m_3$ coordinate values in the first set of coordinate values and corresponds to $m_4$ coordinate values in the second set of coordinate values, the $m_4$ coordinate values are in one-to-one correspondence with the $m_3$ coordinate values; and each of the at least one facial expression coefficient is multiplied by A_id and then added to a corresponding coordinate value in the second set of coordinate values, so as to obtain a corresponding coordinate value in the first set of coordinate values, where $m_3$ and $m_4$ are integers, $1 \leq m_3$ and $m_3 = m_4$.

Exemplarily, the facial expression detection method further comprises: obtaining a sample image and labeled data corresponding thereto, the labeled data comprising a shape parameter and a facial expression parameter of a sample face in the sample image; and training the neural network model with the sample image and the shape parameter and the facial expression parameter of the sample face, where the sample image is an input of the neural network model, and the shape parameter and the facial expression parameter of the sample face are target outputs of the neural network model; where coordinates of feature points of the sample face satisfy the face relation.

Exemplarily, obtaining a sample image and labeled data corresponding thereto comprises: obtaining the sample image; performing face detection on the sample image, to determine a position of the sample face; positioning the feature points of the sample face in the sample image; and calculating the shape parameter and the facial expression parameter of the sample face based on a positioning result of the feature points of the sample face to obtain the labeled data.

Exemplarily, obtaining a sample image and labeled data corresponding thereto comprises: obtaining the sample image and position label information of the feature points of the sample face; and calculating the shape parameter and the facial expression parameter of the sample face based on the position label information of the feature points of the sample face to obtain the labeled data.

Exemplarily, obtaining a sample image and labeled data corresponding thereto comprises: obtaining the labeled data; generating a face model of the sample face based on the labeled data; rendering the face model to obtain a face model generation image; and obtaining the sample image based on the face model generation image that is rendered.

Exemplarily, obtaining an image to be processed comprises: obtaining an initial image; performing face detection on the initial image to identify the target face; and obtaining the image to be processed including the target face based on the initial image.

Exemplarily, performing face detection on the initial image to identify the target face comprises: performing the face detection on the initial image; respectively comparing feature information of detected faces with feature information of a preset face stored in a face feature database; and determining a first face in the detected faces that matches the preset face as the target face.

Exemplarily, performing face detection on the initial image to identify the target face comprises: performing the face detection on the initial image; and selecting, from detected faces, a second face that satisfies a preset requirement as the target face.

Exemplarily, the preset requirement comprises that the second face is a face having a largest area among the detected faces.

According to another aspect of the present disclosure, a facial expression driving method is provided, and comprises: obtaining an image to be processed; inputting the image to be processed into a neural network model to obtain a facial expression parameter of a target face in the image to be processed; and driving an object to be driven based on the facial expression parameter of the target face.

Exemplarily, driving an object to be driven based on the facial expression parameter of the target face comprises: determining an object facial expression of the object to be driven that matches the facial expression parameter of the target face; and presenting the object to be driven having the object facial expression that matches the facial expression parameter of the target face.

Exemplarily, driving an object to be driven based on the facial expression parameter of the target face comprises: determining an object action of the object to be driven that matches the facial expression parameter of the target face; and controlling the object to be driven to perform the object action.

Exemplarily, the facial expression driving method further comprises: receiving a selection instruction input by a user; and selecting the object to be driven from one or more predetermined objects based on the selection instruction.

According to another aspect of the present disclosure, a facial expression detection device is provided, and comprises: a first obtaining module, configured to obtain an image to be processed; a first input module, configured to input the image to be processed into a neural network model to obtain a facial expression parameter of a target face in the image to be processed; and an output module, configured to output the facial expression parameter of the target face for driving an object to be driven.

According to another aspect of the present disclosure, a facial expression driving device is provided, and comprises: a second obtaining module, configured to obtain an image to be processed; a second input module, configured to input the image to be processed into a neural network model to obtain a facial expression parameter of a target face in the image to be processed; and a drive module, configured to drive an object to be driven based on the facial expression parameter of the target face.

According to another aspect of the present disclosure, a facial expression detection system is provided, and comprises: a processor and a memory, the memory stores computer program instructions, and the computer program instructions are capable of being executed by the processor to implement the above-mentioned facial expression detection method.

According to another aspect of the present disclosure, a facial expression driving system is provided, and comprises: a processor and a memory, the memory stores computer program instructions, and the computer program instructions are capable of being executed by the processor for performing: obtaining an image to be processed; inputting the image to be processed into a neural network model to obtain a facial expression parameter of a target face in the image to be processed; and driving an object to be driven based on the facial expression parameter of the target face.

Exemplarily, an operation of driving an object to be driven based on the facial expression parameter of the target face comprises: determining an object facial expression of the object to be driven that matches the facial expression parameter of the target face; and presenting the object to be driven having the object facial expression that matches the facial expression parameter of the target face.

Exemplarily, an operation of driving an object to be driven based on the facial expression parameter of the target face comprises: determining an object action of the object to be driven that matches the facial expression parameter of the target face; and controlling the object to be driven to perform the object action.

Exemplarily, the computer program instructions are capable of being executed by the processor for further performing: receiving a selection instruction input by a user; and selecting the object to be driven from one or more predetermined objects based on the selection instruction.

According to another aspect of the present disclosure, a storage medium is provided, program instructions are stored on the storage medium, and the program instructions are capable of being executed to perform the above-described facial expression detection method.

According to another aspect of the present disclosure, a storage medium is provided, program instructions are stored on the storage medium, and the program instructions are capable of being executed to perform the above-described facial expression driving method.

BRIEF DESCRIPTION OF THE DRAWINGS

By describing embodiments of the present disclosure in more detail in conjunction with the drawings, the above and other objects, features and advantages of the present disclosure will become more obvious. The drawings are provided for further understanding the embodiments of the present disclosure, constitute a part of the specification, are used for explaining the present disclosure together with the embodiments of the present disclosure, and are not intended to limit the present disclosure. In the drawings, same reference numerals usually denote same components or steps.

DETAILED DESCRIPTION

In order to make objects, technical solutions and advantages of the present disclosure more obvious, example embodiments according to the present disclosure will be described in detail below in conjunction with the accompanying drawing. Apparently, the described embodiments are just a part but not all of the embodiments of the present disclosure. It should be understood that the present disclosure is not limited by the example embodiments described herein.

The above-described problems existing in the existing facial expression driving technology are mainly related to a facial expression detection process. In order that an object to be driven accurately reacts accordingly following with a facial expression of a face, various facial expressions of the face need to be more accurately identified. In order to detect the facial expression of the face, above-mentioned methods such as introducing a 3D device, pre-registering a user's face, or performing complicated feature extraction are taken in the prior art, resulting in problems, such as reliability on an expensive device, insufficient automation, and computing complexity, in the existing facial expression driving technology.

In order to solve the above-described problems, embodiments of the present disclosure provide a facial expression detection method, device, system and a storage medium, and a facial expression driving method, device, system and a storage medium; inputs of the facial expression detection system and the facial expression driving system only rely on an image or a video stream, thus the facial expression detection system and the facial expression driving system are fully automated and have a fast speed, and can be performed in real-time on a computing-constrained platform such as a mobile phone and the like. The facial expression detection method, the facial expression detection device, the facial expression driving method and the facial expression driving device according to the embodiments of the present disclosure may be applied to various facial expression driving fields, for example, driving a virtual object to make a facial expression that is consistent with a facial expression of a face.

Firstly, an exemplary electronic device 100 for implementing the facial expression detection method and device or the facial expression driving method and device according to an embodiment of the present disclosure will be described with reference to FIG. 1.

Figure 1:
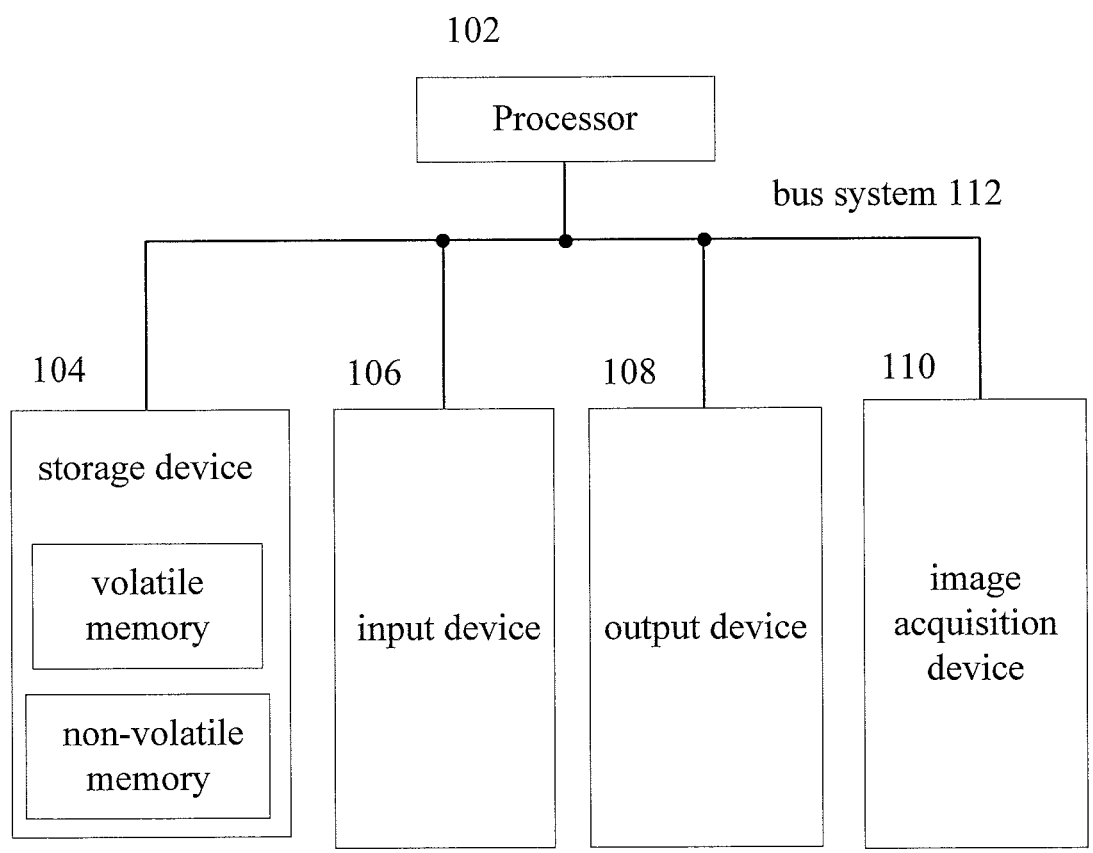
FIG. 1 illustrates a schematic block diagram of an exemplary electronic device for implementing a facial expression detection method and a facial expression detection device or a facial expression driving method and a facial expression driving device according to an embodiment of the present disclosure.

As shown in FIG. 1, the electronic device 100 comprises one or more processors 102, and one or more storage devices 104. Optionally, the electronic device 100 may further comprise an input device 106, an output device 108 and an image acquisition device 110; and these components are interconnected through a bus system 112 and/or other forms of connection mechanisms (not shown). It should be noted that, the components and structures of the electronic device 100 illustrated in FIG. 1 are merely exemplary and not limitative, and the electronic device 100 may have other components and structures according to needs.

The processor 102 may be implemented by adopting at least one hardware form selected from the group consisting of a microprocessor, a digital signal processor (DSP), a field programmable gate array (FPGA), and a programmable logic array (PLA); the processor 102 may be one or any combination of several of a central processing unit (CPU), an image processor (GPU), an application specific integrated circuit (ASIC), or other forms of processing units having a data processing capability and/or an instruction execution capability, and may control other components in the electronic device 100 to perform desired functions.

The storage device 104 may comprise one or more computer program products, the computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, a flash memory, and the like. One or more computer program instructions may be stored on the computer-readable storage medium, and the processor 102 may execute the program instructions to implement client functions and/or other desired functions (implemented by a processor) in the embodiments of the present disclosure described below. Various applications, various data, various data used and/or generated by the applications, and the like, may also be stored in the computer-readable storage medium.

The input device 106 may be a device used by a user for inputting an instruction, and may include one or more of a keyboard, a mouse, a microphone, a touch screen, and the like.

The output device 108 may output various information (e.g., an image and/or a sound) to the outside (e.g., the user), and may include one or more of a display, a loudspeaker, and the like. Optionally, the input device 106 and the output device 108 may be integrated together and implemented with a same interactive device (e.g., a touch screen).

The image acquisition device 110 may acquire an image (including a static image and a video frame), for example, a face image of a user, etc., and store the acquired image in the storage device 104 for use by other components. The image acquisition device 110 may be a separate camera or a camera in a mobile terminal. It should be understood that, the image acquisition device 110 is merely exemplary, and the electronic device 100 may not include the image acquisition device 110. In this case, other devices having an image acquisition capability may be used for acquiring an image, and transmit the acquired image to the electronic device 100.

The electronic device 100 may also include a communication device (not shown). The communication device can implement communication between the various components in the electronic device 100. The network may comprise a wireless network, a wired network, and/or any combination of the wireless network and the wired network.

Exemplarily, the exemplary electronic device for implementing the facial expression detection method and the facial expression detection device according to the embodiment of the present disclosure may be implemented on a device such as a personal computer or a remote server.

Figure 2:
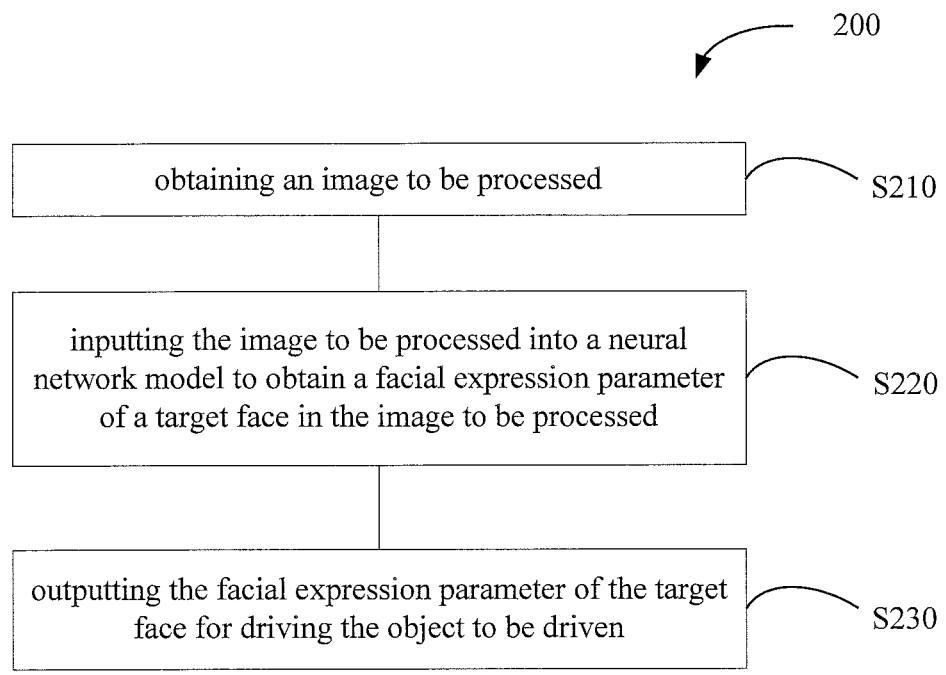
FIG. 2 illustrates a schematic flow chart of a facial expression detection method according to an embodiment of the present disclosure.

Hereinafter, the facial expression detection method according to the embodiment of the present disclosure will be described with reference to FIG. 2. FIG. 2 illustrates a schematic flow chart of a facial expression detection method 200 according to an embodiment of the present disclosure. As shown in FIG. 2, the facial expression detection method 200 comprises following steps S210, S220 and S230.

Step S210: obtaining an image to be processed.

An initial image including a target face may be acquired by the above-described image acquisition device 110, the image to be processed may be generated based on the acquired initial image, or the acquired initial image may be directly taken as the image to be processed. The target face may be arbitrary face, such as a face of a user of a mobile terminal. The image acquisition device may acquire one or more initial images. In one example, each initial image may be a separate static image. In another example, each initial image may be a video frame, that is to say, the image acquisition device may acquire a video. In a case where the image acquisition device acquires the video, respective initial images (i.e., respective video frames in the video) may be separately processed, to obtain images to be processed respectively corresponding to the respective initial images, and step S210 to step S230 are respectively performed on each image to be processed.

Step S220: inputting the image to be processed into a neural network model to obtain a facial expression parameter of a target face in the image to be processed.

Exemplarily, the step S220 may include: inputting the image to be processed into the neural network model to obtain a shape parameter and the facial expression parameter of the target face in the image to be processed.

Exemplarily, the neural network model may be used for fitting a face relation below:

$$V=V\_bar+A\_id*a\_id+A\_exp*a\_exp;$$

Where V represents coordinates of a first feature point on a face in an input image input into the neural network model, V_bar represents coordinates of a second feature point on an average face, the second feature point corresponds to the first feature point, a_id and a_exp respectively represent a shape parameter and a facial expression parameter of the face in the input image. A_id and A_exp respectively represent a reference shape displacement related to a shape of the face and a reference facial expression displacement related to a facial expression of the face, and V_bar, A_id and A_exp are preset values. The input image includes the image to be processed that is acquired in the step S210.

It should be noted that, in the present disclosure, the face relation is a relation in connection with the face of a person (such as, a relation of features points on different faces).

In the disclosure, terms such as "first" and "second" are merely used for a purpose of distinction, and are not intended to denote any order, or other specific meanings. For example, the above-described first feature point refers to a feature point on the face in the input image input into the neural network model, and the second feature point refers to a feature point on the average face. Both the first feature point and the second feature point may include any number of feature points. For example, the face in the input image may comprise a plurality of first feature points, the average face may also comprise a plurality of second feature points, and the plurality of first feature points are in one-to-one correspondence to the plurality of second feature points.

An algorithm model may be built with respect to the face, so that different faces all may be represented with the algorithm model. The above-described face relation may be understood as such an algorithm model. A meaning and an application mode of the above-described face relation will be described in detail below.

In order to distinguish from the average face, in the disclosure, a face that needs to be represented by the face relation is named as a face to be represented. The face to be represented may be a face in the input image input into the neural network model. In a case where the image to be processed is input into the neural network model, the face in the input image is the above-described target face, that is, the face to be represented is the above-described target face. In a case where a sample image is input into the neural network model, the face in the input image is a sample face, that is, the face to be represented is the sample face.

Each face to be represented may have a plurality of (e.g., thousands of) feature points. Exemplarily, the feature points as described herein may include a point on a contour of the face, a point on an eyebrow, a point on an eye (a pupil center, etc.), a point on a nose (a nose tip, etc.), a point on a lip, and the like. Each feature point on the face to be represented may have its own coordinates. With respect to each face to be represented, coordinates of feature point on the face to be represented may be expressed by the above-described face relation.

In the above-described face relation, V_bar represents coordinates of the feature point on the average face. The average face is a standardized face or a template face determined by theories, experiences, or experiments, and the like, coordinates of the feature points on the average face are fixed and preset. It may be understood that, when coordinates of one or some feature points of the average face are appropriately displaced, another face may be obtained. This displacement may be caused by the face shape (different people have different face shapes) and/or caused by the facial expression. Therefore, on the basis of the average face, any face to be represented may be obtained by adjusting positions of the feature points.

The two parameters, i.e., the reference shape displacement A_id and the reference facial expression displacement A_exp, are fixed and preset. In one example, the reference shape displacement A_id may be set to a maximum displacement that may occur to coordinates of the face to be represented with respect to coordinates of the average face when the shape of the face to be represented is changed. Similarly, the reference facial expression displacement A_exp may be set to a maximum displacement that may occur to the coordinates of the face to be represented with respect to the coordinates of the average face, when the facial expression of the face to be represented changes. Sizes of the reference shape displacement A_id and the reference facial expression displacement A_exp may be set according to needs, which will not be limited in the present disclosure. It should be noted that, A_id may be a constant, and may also be a preset multidimensional vector or a preset multidimensional matrix. Similarly, A_exp may be a constant, and may also be a preset multidimensional vector or a preset multidimensional matrix.

In one example, the reference shape displacement A_id may be set to 1, in which case A_id*a_id is equal to a_id, i.e., an effect of A_id may be ignored. Similarly, the reference facial expression displacement A_exp may be set to 1.

The shape parameter a_id may be used for indicating a proportion of a displacement component related to the shape of the face relative to the reference shape displacement A_id, and the displacement component related to the shape of the face is a component in the displacement of the feature point of the face to be represented relative to the feature point of the average face, that is, the shape parameter a_id may be understood as a weight of the reference shape displacement A_id. Similarly, the facial expression parameter a_exp may be used for indicating a proportion of a displacement component related to the facial expression of the face relative to the reference facial expression displacement A_exp, and the displacement component related to the facial expression of the face is a component in the displacement of the feature point of the face to be represented relative to the feature point of the average face, that is, the facial expression parameter a_exp may be understood as a weight of the reference facial expression displacement A_exp.

Shape parameters a_id and/or facial expression parameters a_exp of different faces may be different. In the disclosure, for convenience of description, faces of the same person with different facial expressions are also deemed as different faces. With respect to each face, each face may be represented by the two parameters, i.e., the shape parameter a_id and the facial expression parameter a_exp. A_id*a_id is a result of combining the reference shape displacement A_id and the shape parameter a_id, and A_id*a_id represents the displacement component related to the shape of the face in the displacement of the feature point of the face to be represented relative to the feature point of the average face. A_id*a_id may be used for indicating shape features of the face (including fatness and thinness of the face, distribution and proportion of the five sense organs, etc.), the shape features are intrinsic features of the face, and has no relation with the face expression. That is to say, V_bar+A_id*a_id may be understood as coordinates of respective feature points when the person to whom the face to be represented belongs does not have any facial expression. A_exp*a_exp is a result of combining the reference facial expression displacement A_exp and the facial expression parameter a_exp, and A_exp*a_exp represents the displacement component related to the face expression in the displacement of the feature point of the face to be represented relative to the feature point of the average face. A_exp*a_exp may be used for indicating expression features of the face. For example, if the face to be represented is a little fatter than the average face and is laughing, then the shape parameter and the facial expression parameter of the face to be represented may be: a_id=(0.0, 0.0, . . . , 0.5 (0.5 is a coefficient representing fatness and thinness)), 0.0, . . . ), a_exp=(0.0, 0.0, . . . , 1.0 (1.0 is a coefficient representing laugh), 0.0, . . . ).

Exemplarily, the coordinates of the above-described feature points (e.g., the first feature point and the second feature point) may be three-dimensional coordinates.

According to the embodiment of the present disclosure, the coordinates of the first feature point are represented by a first set of coordinate values, the coordinates of the second feature point are represented by a second set of coordinate values; coordinate values in the first set of coordinate values are in one-to-one correspondence with coordinate values in the second set of coordinate values; a_id includes at least one shape coefficient, each of the at least one shape coefficient corresponds to $m_1$ coordinate values in the first set of coordinate values and corresponds to $m_2$ coordinate values in the second set of coordinate values, the $m_2$ coordinate values are in one-to-one correspondence with the $m_1$ coordinate values; and each of the at least one shape coefficient is multiplied by A_id and then added to a corresponding coordinate value in the second set of coordinate values, so as to obtain a corresponding coordinate value in the first set of coordinate values, where $m_1$ and $m_2$ are integers, $1 \leq m_1$ and $m_1=m_2$.

For example, assuming that the face to be represented has 1000 feature points, and coordinates of each feature point have coordinate values in three dimensions, then the face to be represented has a total of 3000 coordinate values. The number of feature points and the number of coordinate values of the average face are consistent with those of the face to be represented, the feature points of the average face are in one-to-one correspondence with the feature points of the face to be represented, and the coordinate values of the average face are in one-to-one correspondence with the coordinate values of the face to be represented. The shape parameter a_id may include at least one shape coefficient. In one example, corresponding shape coefficients may be respectively set for all coordinate values of the face to be represented, and each shape coefficient corresponds to only one coordinate value of the face to be represented. At a same time, each shape coefficient also corresponds to one coordinate value of the average face, and the coordinate value of the average face corresponding to a shape coefficient also corresponds to the coordinate value of the face to be represented corresponding to the shape coefficient. For example, in a case where the face to be represented and the average face respectively have 3000 coordinate values, 3000 shape coefficients may be set. Each shape coefficient is multiplied by the reference shape displacement A_id and then added to a corresponding coordinate value of the average face, so as to obtain a corresponding coordinate value of the face to be represented. In the example, with respect to each shape coefficient, there is $m_1=m_2=1$.

Because adjacent feature points on each face are usually related to each other, for example, when the face to be represented, as compared with the average face, has smaller eyes, upper eyelids of the face to be presented may have a plurality of feature points that are simultaneously displaced downward with respect to those on the average face, and the displacements of the plurality of feature points are approximate. In this case, the same shape coefficient may be set for these feature points. Therefore, in another example, a separate shape coefficient may be set for at least one set of coordinate values of the face to be represented or the average face, and the number of coordinate values in each set of coordinate values of the at least one set of coordinate values (i.e., $m_1$ or $m_2$ coordinate values as described above) is more than one. There is a certain displacement correlation among all coordinate values in each set of coordinate values. For example, only 100 shape coefficients may be set for the above-described 3000 coordinate values, for example, 36 coordinate values of 12 feature points on the upper eyelids can share one shape coefficient. When the face relation is calculated, each shape coefficient is multiplied by the reference shape displacement A_id and then added to the coordinate value of the average face corresponding to the shape coefficient. In the above-described mode, an amount of parameters may be greatly reduced, so that not only a workload of labeling may be saved in a training process of the neural network model, to improve training efficiency of the model, but also efficiency of facial expression detection and driving may be improved in a practical application process of the neural network model. In addition, by reducing the amount of parameters, volume of the neural network model may also be reduced, which is favorable for the neural network model to be executed on a platform with limited computing power.

In the above-described example of reducing the amount of parameters, for at least part of the shape coefficients, there is $1<m_1$, $m_1=m_2$. It should be understood that, the numbers of coordinate values corresponding to different shape coefficients may be identical or different, and may be set as needed.

According to an embodiment of the present disclosure, the coordinates of the first feature point are represented by a first set of coordinate values, the coordinates of the second feature point are represented by a second set of coordinate values; and coordinate values in the first set of coordinate values are in one-to-one correspondence with coordinate values in the second set of coordinate values; a_exp includes at least one facial expression coefficient, and each of the at least one facial expression coefficient corresponds to $m_3$ coordinate values in the first set of coordinate values and corresponds to $m_4$ coordinate values in the second set of coordinate values, the $m_4$ coordinate values are in one-to-one correspondence with the $m_3$ coordinate values; and each of the at least one facial expression coefficient is multiplied by A_id and then added to a corresponding coordinate value in the second set of coordinate values, so as to obtain a corresponding coordinate value in the first set of coordinate values, where $m_3$ and $m_4$ are integers, $1 \le m_3$ and $m_3=m_4$.

A setting method of the shape coefficient is described above, and a setting method of the facial expression coefficient is similar thereto, for example, facial expression coefficients may be respectively set for all coordinate values of the face to be represented or the average face, a separate shape coefficient may also be set for at least one set of coordinate values of the face to be represented or the average face, and the number of coordinate values in each set of coordinate values of the at least one set of coordinate values (i.e., $m_3$ or $m_4$ coordinate values as described above) is more than one. Those skilled in the art may understand the setting method of the facial expression coefficient and advantages thereof, with reference to the above description of the shape coefficient, and details will not be repeated herein.

After the neural network model receives the image to be processed, the neural network model may output the shape parameter and the facial expression parameter of the corresponding target face. The embodiment, in which the neural network model is used for fitting the above-described face relation, is merely exemplary and thus is not limitative to the present disclosure, and the shape parameter and the facial expression parameter of the face are not limited to the above-described forms.

Exemplarily, the neural network model may further output device parameters (e.g., camera parameters) of the image acquisition device for acquiring the initial image. The device parameters may include: a focal length, an optical center and a height of the image acquisition device, a size of the acquired image, and the like.

Step S230: outputting the facial expression parameter of the target face for driving the object to be driven.

The object to be driven is an object that currently needs to match the facial expression of the target face to make a corresponding reaction based on the facial expression of the target face. Exemplarily, the reaction may include an action, a facial expression, a morphological change (zoom in, zoom out), and the like. Exemplarily, the object to be driven may be an object that the user autonomously selects from a plurality of predetermined objects. Exemplarily, the object to be driven may be an object set by default by the system, or an object selected from the plurality of predetermined objects by the system randomly or based on a preset rule.

The object to be driven may be any object, and includes but not limited to, a virtual object and a real object. The virtual object as described in the present disclosure may be any object generated by using a computer technology, and includes but not limited to: a cartoon characters such as a cartoon cat and a cartoon dog, a simulated object generated based on an actual object such as a simulated face, or an object fabricated by imagination alone, and the like. The virtual object may be a two-dimensional object or a three-dimensional object. The real object may be, for example, a robot, and the like. For example, when the user makes a smiling expression, the robot may be driven to raise an arm.

In the facial expression detection method according to the embodiment of the present disclosure, the facial expression parameters of the face are calculated by using a neural network-based depth learning method. Compared with a traditional method, input of the above-described facial expression detection method only relies on the image or the video stream, the above-described facial expression detection method is fully automated, is simple to implement, have a fast speed, and is convenient to be performed in real-time on a computing-constrained platform such as a mobile phone and the like.

Exemplarily, the facial expression detection method according to the embodiment of the present disclosure may be implemented in an apparatus, a device or a system having a memory and a processor.

The facial expression detection method according to the embodiment of the present disclosure may be deployed at a personal terminal, for example, a smart phone, a tablet computer, a personal computer, and the like.

Alternatively, the facial expression detection method according to the embodiment of the present disclosure may also be distributed at a server and a client. For example, the image to be processed may be obtained on the client (for example, the face image of the user is acquired on an image acquisition side), the client transmits the obtained image to the server (or the network cloud), and the server (or the network cloud) performs facial expression detection or facial expression driving.

According to the embodiment of the present disclosure, the facial expression detection method 200 further comprises: obtaining a sample image and labeled data corresponding thereto, the labeled data comprising a shape parameter and a facial expression parameter of a sample face in the sample image; and training the neural network model with the sample image and the shape parameter and the facial expression parameter of the sample face, where the sample image is an input of the neural network model, and the shape parameter and the facial expression parameter of the sample face are target outputs of the neural network model; coordinates of feature points of the sample face satisfy the face relation.

A large number of sample images including sample faces may be collected, labeled data corresponding to each sample image can be obtained, and the labeled data includes a shape parameter (a known shape parameter) and a facial expression parameter (a known facial expression parameter) of the corresponding sample face. A training process of the neural network model is as follows: the sample image is input into the neural network model, so as to obtain a training shape parameter and a training facial expression parameter output by the neural network model. The known shape parameter and the known facial expression parameter are taken as target values of the training shape parameter and the training facial expression parameter, to continuously optimize the neural network model. Those skilled in the art may understand the training process of the neural network model, which will not be repeated herein.

Exemplarily, the neural network model may be implemented with a convolutional neural network. Exemplarily, the neural network model may be a lightweight model, for example, shufflenet, capable of being run on a computing-constrained platform such as a mobile phone and the like.

In an example, obtaining a sample image and labeled data corresponding thereto comprises: obtaining the sample image; performing face detection on the sample image, to determine a position of the sample face; positioning the feature points of the sample face in the sample image; and calculating the shape parameter and the facial expression parameter of the sample face based on a positioning result of the feature points of the sample face to obtain the labeled data.

The sample image may be collected firstly, and then the sample image is processed by using a face detection algorithm and a feature point positioning algorithm, to determine a position of each feature point of the sample face. Subsequently, the feature points of the sample face can be analyzed, to obtain the shape parameter and the facial expression parameter of the sample face.

In another example, obtaining a sample image and labeled data corresponding thereto comprises: obtaining the sample image and position label information of the feature points of the sample face; and calculating the shape parameter and the facial expression parameter of the sample face based on the position label information of the feature points of the sample face to obtain the labeled data.

The sample image may be collected firstly, and the feature points on the sample face are manually labeled one by one, to determine a position of each feature point on the sample face. Subsequently, the feature points of the sample face may be analyzed, to obtain the shape parameter and the facial expression parameter of the sample face.

In still another example, obtaining a sample image and labeled data corresponding thereto comprises: obtaining the labeled data; generating a face model of the sample face based on the labeled data; rendering the face model to obtain a face model generation image; and obtaining the sample image based on the face model generation image that is rendered.

The shape parameter and the facial expression parameter may be preset, and then a three-dimensional human face model is generated by rendering the shape parameter and the facial expression parameter preset. Subsequently, the three-dimensional face model may be converted into a face image (for example, a face model generation image), and the face image is taken as the sample image.

According to the embodiment of the present disclosure, the step S210 may include: obtaining an initial image; performing face detection on the initial image to identify the target face; and obtaining the image to be processed including the target face based on the initial image.

The initial image may be an image acquired by the image acquisition device. When the face detection is performed on the initial image, a plurality of faces can be detected.

In one example, performing face detection on the initial image to identify the target face, includes: performing face detection on the initial image; and determining that a detected face is the target face.

In some cases, by manual or system control, the initial image may include only one face, and at this time, the face detected in the initial image may be directly taken as the target face.

In another example, performing face detection on the initial image to identify the target face, includes: performing face detection on the initial image; respectively comparing feature information of detected faces with feature information of a preset face stored in a face feature database; and determining a first face in the detected faces that matches the preset face as the target face.

In some cases, the initial image may include one or more faces (e.g., in a place where there is a large stream of people). Each face detected from the initial image may be compared with the preset face, and the first face matching the preset face may be selected from the detected faces as the target face. For example, the preset face may be the face of the user of the mobile terminal, the user of the mobile terminal may register his/her face on the mobile terminal in advance, and the mobile terminal stores the face information of the user for subsequent comparison with faces detected in the initial image.

In still another example, performing face detection on the initial image to identify the target face, includes: performing face detection on the initial image; and selecting, from the detected faces, a second face that satisfies a preset requirement as the target face.

Exemplarily, the preset requirement may include that the second face is a face having a largest area among the detected faces. As described above, in some cases, the initial image may include one or more faces. Exemplarily, in a case where the initial image includes a plurality of faces, a largest face (a main face) may be selected from the detected faces as the target face. Exemplarily, a clearest face may also be selected from the detected faces as the target face.

According to the embodiment of the present disclosure, obtaining the image to be processed including the target face based on the initial image, may include: performing one or more operations of cropping, zooming and rotating on the initial image, based on a size and/or an angle of the target face in the initial image, to obtain the image to be processed, where the size and/or the angle of the target face in the image to be processed satisfies requirements that the user preset.

The target face in the initial image is sometimes too large or too small, or the angle of the target face is tilted, which is not conducive to subsequent identification and processing. In this case, the initial image may be subjected to certain processing such as rotating, zooming and cropping, so that the size and the angle of the target face in the obtained image may satisfy subsequent processing requirements. Those skilled in the art may understand methods of cropping, zooming and rotating the initial image based on a state (a size, an angle, etc.) of the target face, which will not be repeated herein.

Figure 3:
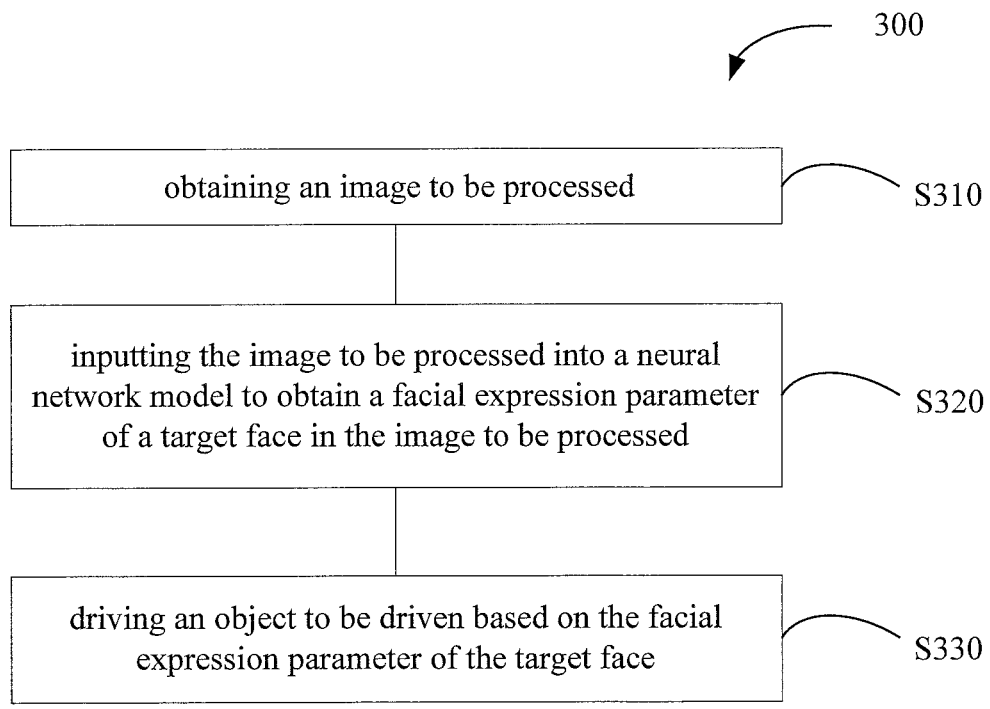
FIG. 3 illustrates a schematic flow chart of a facial expression driving method according to an embodiment of the present disclosure.

According to another aspect of the present disclosure, a facial expression driving method is provided. FIG. 3 illustrates a schematic flow chart of a facial expression driving method 300 according to an embodiment of the present disclosure. As shown in FIG. 3, the facial expression driving method 300 comprises following step S310, step S320 and step S330.

Step S310: obtaining an image to be processed.

Step S320: inputting the image to be processed into a neural network model to obtain a facial expression parameter of a target face in the image to be processed.

Step S330: driving an object to be driven based on the facial expression parameter of the target face.

The step S310 to the step S320 are consistent with the step S210 to the step S220 in the above-described facial expression detection method 200, and those skilled in the art may understand the step S310 to the step S320 according to the above description of the facial expression detection method 200, and details will not be repeated herein.

In one example, the step S330 may include: determining an object facial expression of the object to be driven that matches the facial expression parameter of the target face; and presenting the object to be driven having the object facial expression that matches the facial expression parameter of the target face.

Exemplarily, in a case where the object to be driven is a virtual object, after the object to be driven is determined, the object to be driven may also be displayed by a display device, and the displayed object to be driven may have a default facial expression. When a user makes some facial expression, the virtual object may make a facial expression consistent with the user, and at the same time, a current facial expression of the virtual object may be displayed in real time on the display device.

For example, different facial expressions of the virtual object may be expressed with different facial expression coefficients, and the facial expression parameter a_exp of the target face obtained in the step S320 may be applied to the virtual object. For example, 46 facial expression coefficients may be set for each face (i.e., the facial expression parameter a_exp includes 46 facial expression coefficients), 15 common facial expressions are designed for each virtual object, and then a mapping relation between the 46 coefficients and the 15 facial expressions may be established. When facial expression driving is actually performed, a corresponding virtual object facial expression may be found based on the facial expression parameter of the target face and the above-described mapping relation.

In one example, the object to be driven may be presented separately. For example, a static image, a dynamic image or a video including only the object to be driven may be displayed through the display device. The object facial expression of the object to be driven may be changed at any time. After the object facial expression that matches the facial expression parameter of the target face is determined, the object to be driven having the object facial expression may be presented in a form of a static image, a dynamic image or a video.

In still another example, the object to be driven may be presented together with background information. The background information may be any information, such as game scene information and the like. The object facial expression of the object to be driven may be changed at any time. After the object facial expression that matches the facial expression parameter of the target face is determined, the object to be driven having the object facial expression may be combined with the background information, and then presented in the form of a static image, a dynamic image or a video. During a process of presenting the object to be driven, the background information may be static, and may also be changed over time.

In another example, the step S330 may include: determining an object action of the object to be driven that matches the facial expression parameter of the target face; and controlling the object to be driven to perform the object action.

For example, when the target face makes a smiling expression, a robot may raise an arm. Of course, a virtual object may also perform some actions, for example, nodding, etc., following the facial expression of the target face.

According to the embodiment of the present disclosure, the facial expression driving method 300 may further comprise: receiving a selection instruction input by the user; and selecting the object to be driven from one or more predetermined objects based on the selection instruction.

As described above, one object may be autonomously selected by the user from one or more predetermined objects as the object to be driven. Exemplarily, the user may input the selection instruction through an input device such as a mouse, a keyboard, a touch screen, a microphone, and the like. The way in which the user autonomously selects the object to be driven is highly interactive, so user experience is good.

Figure 4:
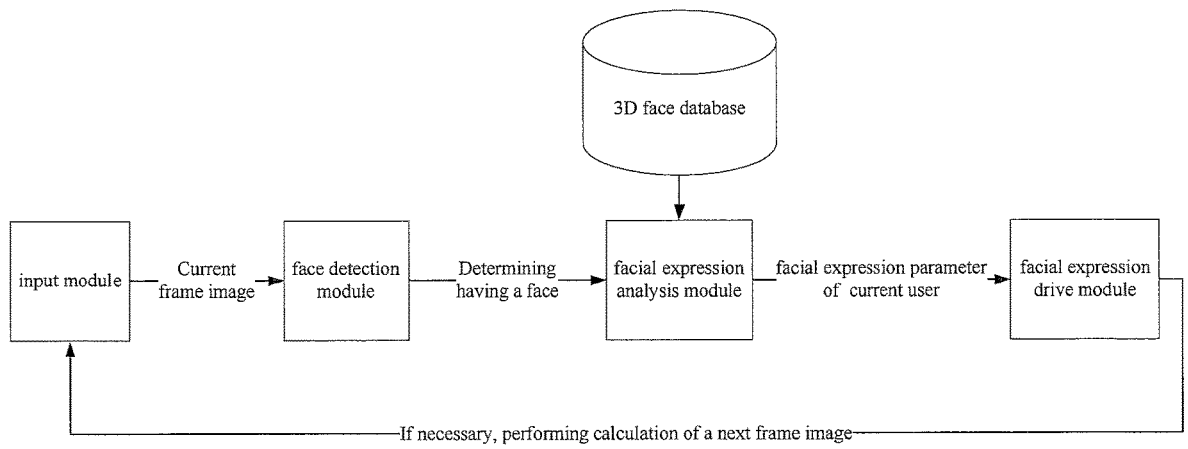
FIG. 4 illustrates a schematic diagram of a facial expression driving process according to an example of the present disclosure.

FIG. 4 illustrates a schematic diagram of a facial expression driving process according to an example of the present disclosure. As shown in FIG. 4, firstly, an image acquisition module acquires image data, and transmits the acquired image data to a face detection module. The image acquisition module may be a camera, a pick-up head, and the like. The acquired image data may be a single image, or may also be a video stream. The video stream may be split into a plurality of image frames.

Subsequently, the face detection module may perform face detection on the received image. The face detection method will not be repeated here. If the received image comprises a face, then a face region is extracted and transmitted to a next module (for example, a facial expression detection module).

A facial expression analysis module (or the facial expression detection module) may perform the above-described facial expression detection method 200 or perform step S310 to step S320 in the facial expression driving method 300. A 3D face database may be used for storing three parameters, i.e., V_bar, A_id and A_exp in the face relation as described above. The facial expression analysis module detects to obtain a facial expression parameter of a current user (i.e., the facial expression parameter of the target face) and transmits the same to a facial expression drive module. The facial expression drive module may perform the above-described step S330, so as to drive the object to be driven to make a facial expression, an action, and the like, corresponding to the facial expression parameter of the current user. If necessary, it may return to the first step, continue to acquire a next frame image, and perform steps of face detection, facial expression analysis, and facial expression driving, and the like.

Figure 5:
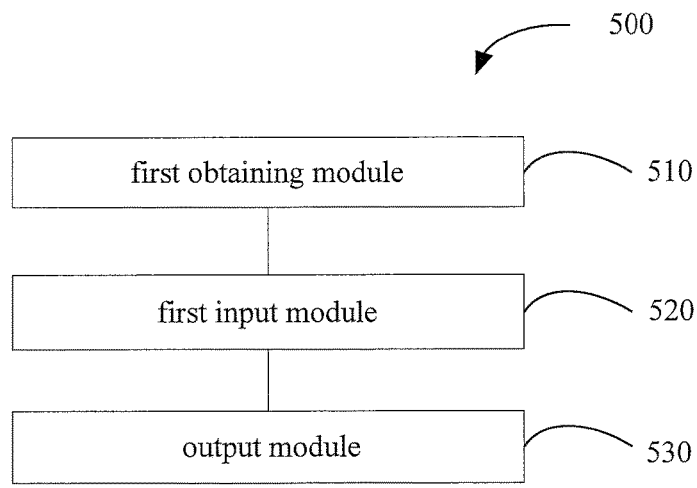
FIG. 5 illustrates a schematic block diagram of a facial expression detection device according to an embodiment of the present disclosure.

According to another aspect of the present disclosure, a facial expression detection device is provided. FIG. 5 illustrates a schematic block diagram of a facial expression detection device 500 according to an embodiment of the present disclosure.

As shown in FIG. 5, a facial expression detection device 500 according to an embodiment of the present disclosure comprises a first obtaining module 510, a first input module 520 and an output module 530. The respective modules may respectively perform the respective steps/functions of the facial expression detection method as described above in conjunction with FIG. 2. Only main functions of respective components of the facial expression detection device 500 will be described below, and the details already described above are omitted.

The first obtaining module 510 is configured to obtain an image to be processed. The first obtaining module 510 may be implemented by the processor 102 in the electronic device shown in FIG. 1 executing program instructions stored in the storage device 103.

The first input module 520 is configured to input the image to be processed into a neural network model to obtain a facial expression parameter of a target face in the image to be processed. The input module 520 may be implemented by the processor 102 in the electronic device shown in FIG. 1 executing program instructions stored in the storage device 103.

The output module 530 is configured to output the facial expression parameter of the target face for driving an object to be driven. The output module 530 may be implemented by the processor 102 in the electronic device shown in FIG. 1 executing program instructions stored in the storage device 103.

Figure 6:
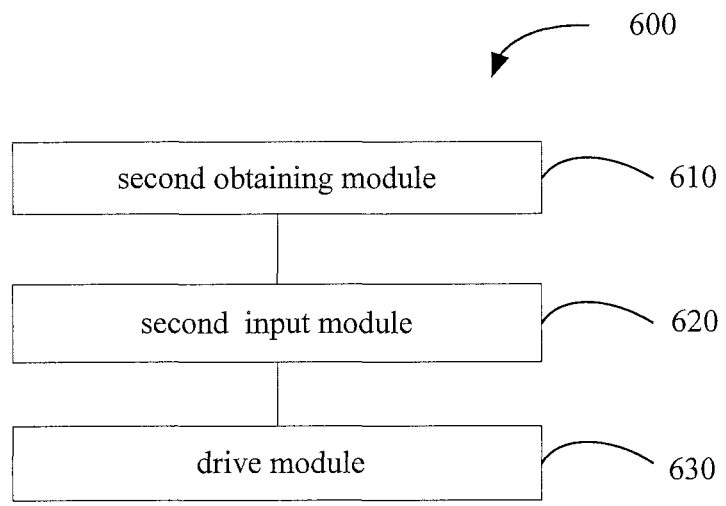
FIG. 6 illustrates a schematic block diagram of a facial expression driving device according to an embodiment of the present disclosure.

According to another aspect of the present disclosure, a facial expression driving device is provided. FIG. 6 illustrates a schematic block diagram of a facial expression driving device 600 according to an embodiment of the present disclosure.

As shown in FIG. 6, a facial expression driving device 600 according to an embodiment of the present disclosure comprises a second obtaining module 610, a second input module 620 and a drive module 630. The respective modules may respectively perform the respective steps/functions of the facial expression driving method as described above in conjunction with FIG. 3 to FIG. 4. Only main functions of respective components of the facial expression driving device 600 will be described below, and the details already described above are omitted.

The second obtaining module 610 is configured to obtain an image to be processed. The second obtaining module 610 may be implemented by the processor 102 in the electronic device shown in FIG. 1 executing program instructions stored in the storage device 103.

The second input module 620 is configured to input the image to be processed into a neural network model to obtain a facial expression parameter of a target face in the image to be processed. The input module 620 may be implemented by the processor 102 in the electronic device shown in FIG. 1 executing program instructions stored in the storage device 103.

The drive module 630 is configured to drive an object to be driven based on the facial expression parameter of the target face. The drive module 630 may be implemented by the processor 102 in the electronic device shown in FIG. 1 executing program instructions stored in the storage device 103.

Those of ordinary skilled in the art may be aware that units and algorithm steps of respective examples described in conjunction with the embodiments disclosed in the present disclosure may be implemented with electronic hardware or a combination of computer software and electronic hardware. Whether these functions are performed in hardware or software depends on specific applications and design constraint conditions of the technical solutions. Those skilled in the art may implement the described functions of each specific application by using different methods; however, it should not be considered that the implementations go beyond the scope of the present disclosure.

Figure 7:
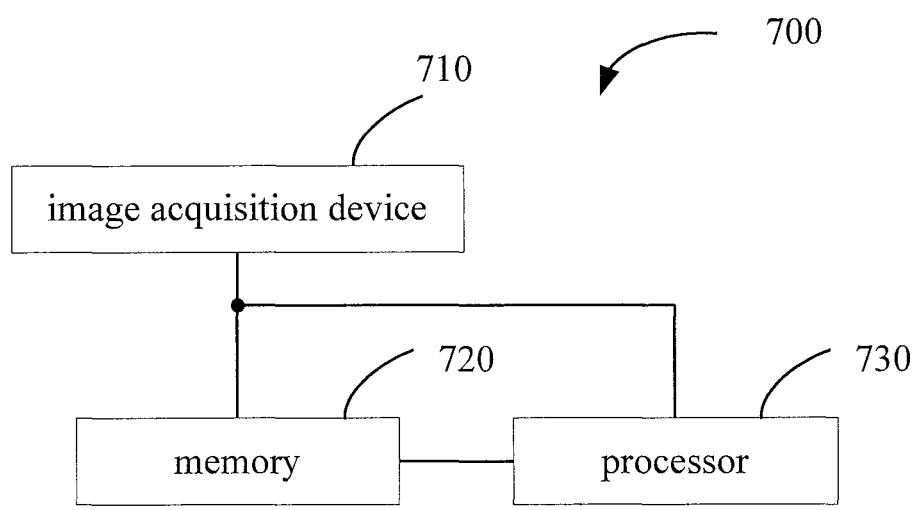
FIG. 7 illustrates a schematic block diagram of a facial expression detection system according to an embodiment of the present disclosure.

FIG. 7 illustrates a schematic block diagram of a facial expression detection system 700 according to an embodiment of the present disclosure. The facial expression detection system 700 comprises an image acquisition device 710, a memory 720, and a processor 730.

The image acquisition device 710 is configured to acquire an image (including an image to be processed and/or a sample image). The image acquisition device 710 is optional, and the facial expression detection system 700 may not include the image acquisition device 710. In this case, optionally, other image acquisition device may be used for acquiring an image and transmitting the acquired image to the facial expression detection system 700.

The memory 720 stores computer program instructions for implementing corresponding steps in the facial expression detection method according to the embodiment of the present disclosure.

The processor 730 is configured to execute the computer program instructions stored in the memory 720, to perform corresponding steps in the facial expression detection method according to the embodiment of the present disclosure.

In one embodiment, the computer program instructions, when executed by the processor 730, are configured to perform following steps of: obtaining the image to be processed; inputting the image to be processed into a neural network model to obtain a facial expression parameter of a target face in the image to be processed; and outputting the facial expression parameter of the target face for driving an object to be driven.

Figure 8:
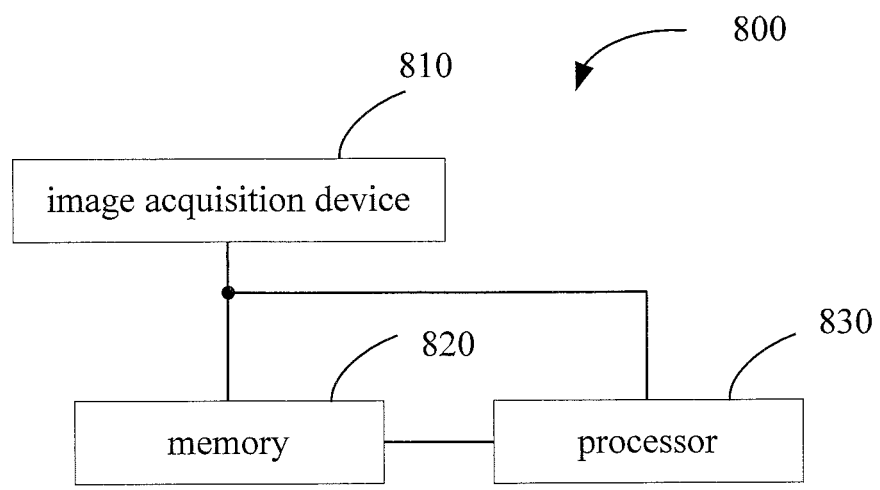
FIG. 8 illustrates a schematic block diagram of a facial expression driving system according to an embodiment of the present disclosure.

FIG. 8 illustrates a schematic block diagram of a facial expression driving system 800 according to an embodiment of the present disclosure. The facial expression driving system 800 comprises an image acquisition device 810, a memory 820, and a processor 830.

The image acquisition device 810 is configured to acquire an image (including an image to be processed and/or a sample image). The image acquisition device 810 is optional, and the facial expression driving system 800 may not include the image acquisition device 810. In this case, optionally, other image acquisition device may be used for acquiring an image and transmitting the acquired image to the facial expression driving system 800.

The memory 820 stores computer program instructions for implementing corresponding steps in the facial expression driving method according to the embodiment of the present disclosure.

The processor 830 is configured to execute the computer program instructions stored in the memory 820, to perform corresponding steps in the facial expression driving method according to the embodiment of the present disclosure.

In one embodiment, the computer program instructions, when executed by the processor 830, are configured to perform following steps of: obtaining the image to be processed; inputting the image to be processed into a neural network model to obtain a facial expression parameter of a target face in the image to be processed; and driving an object to be driven based on the facial expression parameter of the target face.

In one embodiment, the computer program instructions, when executed by the processor 830, are configured to further perform following steps of: receiving a selection instruction input by a user; and selecting the object to be driven from one or more predetermined objects based on the selection instruction.

Further, according to an embodiment of the present disclosure, a storage medium is further provided, and program instructions are stored on the storage medium. The program instructions, when executed by a computer or a processor, are used for performing corresponding steps in the facial expression detection method according to the embodiment of the present disclosure, and are also used for implementing functions of corresponding modules in the facial expression detection device according to the embodiment of the present disclosure. The storage medium may include, for example, a memory card of a smart phone, a storage unit of a tablet computer, a hard disk of a personal computer, a read only memory (ROM), an erasable programmable read only memory (EPROM), a portable compact disk read only memory (CD-ROM), a USB memory, or any combination of the above-described storage media.

In one embodiment, the program instructions, when executed by a computer or a processor, may cause the computer or the processor to implement functions of respective functional modules of a facial expression detection device according to the embodiment of the present disclosure, and/or may perform the facial expression detection method according to the embodiment of the present disclosure.

In one embodiment, the program instructions, when executed, are configured to perform following steps of: obtaining an image to be processed; inputting the image to be processed into a neural network model to obtain a facial expression parameter of a target face in the image to be processed; and outputting the facial expression parameter of the target face for driving an object to be driven.

Further, according to an embodiment of the present disclosure, a storage medium is further provided, and program instructions are stored on the storage medium. The program instructions, when executed by a computer or a processor, are used for performing corresponding steps in the facial expression driving method according to the embodiment of the present disclosure, and are also used for implementing functions of corresponding modules in the facial expression driving device according to the embodiment of the present disclosure. The storage medium may include, for example, a memory card of a smart phone, a storage unit of a tablet computer, a hard disk of a personal computer, a read only memory (ROM), an erasable programmable read only memory (EPROM), a portable compact disk read only memory (CD-ROM), a USB memory, or any combination of the above-described storage media.

In one embodiment, the program instructions, when executed by a computer or a processor, may cause the computer or the processor to implement functions of respective functional modules of a facial expression driving device according to the embodiment of the present disclosure, and/or may perform the facial expression driving method according to the embodiment of the present disclosure.

In one embodiment, the program instructions, when executed, are configured to perform following steps of: obtaining an image to be processed; inputting the image to be processed into a neural network model to obtain a facial expression parameter of a target face in the image to be processed; and driving an object to be driven based on the facial expression parameter of the target face.

Respective modules in the facial expression detection system according to the embodiment of the present disclosure may be implemented by a processor of an electronic device for implementing facial expression detection according to the embodiment of the present disclosure executing computer program instructions stored in a memory, or may be implemented when computer instructions stored in a computer readable storage medium of a computer program product according to the embodiment of the present disclosure are executed by a computer.

Respective modules in the facial expression driving system according to the embodiment of the present disclosure may be implemented by a processor of an electronic device for implementing facial expression driving according to the embodiment of the present disclosure executing computer program instructions stored in a memory, or may be implemented when computer instructions stored in a computer readable storage medium of a computer program product according to the embodiment of the present disclosure are executed by a computer.

Although the exemplary embodiments have been described herein with reference to the drawings, and it should be understood that the above-described exemplary embodiments are merely exemplary, and are not intended to limit the scope of the present disclosure. Those skilled in the art may make various changes and modifications therein without departing from the scope and spirit of the present disclosure. All these changes and modifications are intended to be included within the scope of the present disclosure as claimed in the claims.

Those of ordinary skilled in the art may be aware that units and algorithm steps of respective examples described in conjunction with the embodiments disclosed in the present disclosure may be implemented with electronic hardware or a combination of computer software and electronic hardware. Whether these functions are performed in hardware or software depends on specific applications and design constraint conditions of the technical solutions. Those skilled in the art may implement the described functions of each specific application by using different methods; however, it should not be considered that the implementations go beyond the scope of the present disclosure.

In the several embodiments provided in the present application, it should be understood that the disclosed device and method may be implemented in other manners. For example, the device embodiment as described above is merely exemplary. For example, the division of units is merely logical function division and there may be other division mode in actual implementation; for example, a plurality of units or components may be combined or integrated into another device, or some features may be ignored or not performed.

In the specification provided herein, numerous specific details are described. However, it can be understood that the embodiments of the present disclosure may be implemented without these specific details. In some embodiments, well-known methods, structures and techniques are not shown in detail, so as not to obscure understanding of the present specification.

Similarly, it should be understood that, in order to simplify the present disclosure and to help understand one or more of the respective inventive aspects, in the description of the exemplary embodiments of the present disclosure, the various features of the present disclosure are sometimes grouped together into a single embodiment, a diagram, or description thereof. However, the method of the present disclosure should not be construed as reflecting intention below: that is, the present disclosure claimed requires more features than those explicitly recited in each claim. More specifically, as reflected by the corresponding claims, invention points thereof is based on a fact that the corresponding technical problems may be solved with features fewer than all features of a single embodiment of a certain disclosure. Therefore, the claims following the specific implementation modes are hereby explicitly incorporated into the specific implementation modes, wherein, each claim serves as a separate embodiment of the present disclosure.

Those skilled in the art may understand that, all features disclosed in the present specification (including the claims, the abstract and the drawings appended), and all processes or units of any method or any device so disclosed in the present specification may be combined in any combination mode, except the features that are mutually exclusive. Unless otherwise stated clearly, each feature disclosed in the present specification (including the claims, the abstract and the drawings appended) may be replaced by an alternative feature that provides a same, equivalent or similar purpose.

In addition, those skilled in the art can understand that, although some embodiments described herein include some certain features included in other embodiments other than other features, yet a combination of features of different embodiments are intended to be within the scope of the present disclosure and to form different embodiments. For example, in the claims, any one of the claimed embodiments may be used in any combination mode.

Respective component embodiments of the present disclosure may be implemented in hardware, or in a software module executing on one or more processors, or in a combination thereof. Those skilled in the art should understand that a microprocessor or a digital signal processor (DSP) may be used in practice to implement some or all functions of some modules in the facial expression detection device and/or the facial expression driving device according to the embodiments of the present disclosure. The present disclosure may further be implemented as a device program (e.g., a computer program and a computer program product) for performing some or all of the methods described herein. Such a program for implementing the present disclosure may be stored on a computer readable medium, or may be in a form of one or more signals. Such a signal may be downloaded from an Internet website, or be provided on a carrier signal, or be provided in any other form.

It should be noted that, the above-described embodiments are illustrative of the present disclosure and are not intended to limit the scope of the present disclosure, and those skilled in the art may devise alternative embodiments without departing from the scope of the appended claims. In the claims, any reference sign placed between parentheses shall not be construed as a limitation to the claims. The word "comprising" does not exclude presence of elements or steps that are not recited in the claims. The word "a" or "an" located in front of an element does not exclude presence of a plurality of such elements. The present disclosure may be implemented by means of hardware including a plurality of different elements, and by means of a suitably programmed computer. In unit claims enumerating a plurality of devices, several of these devices may be embodied via a same hardware item. The use of words such as first, second and third does not indicate any order, and these words may be interpreted as names.

What are described above are only specific embodiments of the present application or description of specific embodiments, but the scope of the embodiment of the present disclosure is not limited thereto, and any skilled in the art, within the technical scope disclosed by the present disclosure, can easily think of variations or replacements, which should be covered within the protection scope of the embodiment of the present disclosure. The scope of the present disclosure should be defined by the scope of the accompanying claims.

What is claimed is:

1. A facial expression detection method, comprising:
obtaining an image to be processed;
inputting the image to be processed into a neural network model to obtain a facial expression parameter of a target face in the image to be processed; and
outputting the facial expression parameter of the target face for driving an object to be driven,
wherein the neural network model is used for fitting a face relation below:

$$V = V\_bar + A\_id * a\_id + A\_exp * a\_exp;$$

where V represents coordinates of a first feature point on a face in an input image input into the neural network model, V_bar represents coordinates of a second feature point on an average face, the second feature point corresponds to the first feature point, a_id and a_exp respectively represent a shape parameter and a facial expression parameter of the face in the input image, A_id and A_exp respectively represent a reference shape displacement related to a shape of the face and a reference facial expression displacement related to a facial expression of the face, and V_bar, A_id and A_exp are preset values, and the input image includes the image to be processed.

2. The method according to claim 1, wherein the coordinates of the first feature point are represented by a first set of coordinate values, the coordinates of the second feature point are represented by a second set of coordinate values;
coordinate values in the first set of coordinate values are in one-to-one correspondence with coordinate values in the second set of coordinate values;
a_id comprises at least one shape coefficient, each of the at least one shape coefficient corresponds to $m_1$ coordinate values in the first set of coordinate values and corresponds to $m_2$ coordinate values in the second set of coordinate values, the $m_2$ coordinate values are in one-to-one correspondence with the $m_1$ coordinate values; and
each of the at least one shape coefficient is multiplied by A_id and then added to a corresponding coordinate value in the second set of coordinate values, so as to obtain a corresponding coordinate value in the first set of coordinate values,
where $m_1$ and $m_2$ are integers, $1 \leq m_1$ and $m_1 = m_2$.

3. The method according to claim 1, wherein the coordinates of the first feature point are represented by a first set of coordinate values, the coordinates of the second feature point are represented by a second set of coordinate values;
coordinate values in the first set of coordinate values are in one-to-one correspondence with coordinate values in the second set of coordinate values;
a_exp comprises at least one facial expression coefficient, and each of the at least one facial expression coefficient corresponds to $m_3$ coordinate values in the first set of coordinate values and corresponds to $m_4$ coordinate values in the second set of coordinate values, the $m_4$ coordinate values are in one-to-one correspondence with the $m_3$ coordinate values; and
each of the at least one facial expression coefficient is multiplied by A_id and then added to a corresponding coordinate value in the second set of coordinate values, so as to obtain a corresponding coordinate value in the first set of coordinate values,
where $m_3$ and $m_4$ are integers, $1 \leq m_3$ and $m_3 = m_4$.

4. The method according to claim 1, further comprising:
obtaining a sample image and labeled data corresponding thereto, the labeled data comprising a shape parameter and a facial expression parameter of a sample face in the sample image; and
training the neural network model with the sample image and the shape parameter and the facial expression parameter of the sample face, wherein the sample image is an input of the neural network model, and the shape parameter and the facial expression parameter of the sample face are target outputs of the neural network model;

wherein coordinates of feature points of the sample face satisfy the face relation.

5. The method according to claim 1, wherein obtaining an image to be processed comprises:
   obtaining an initial image;
   performing face detection on the initial image to identify the target face; and
   obtaining the image to be processed including the target face based on the initial image.

6. The method according to claim 4, wherein obtaining a sample image and labeled data corresponding thereto comprises:
   obtaining the sample image;
   performing face detection on the sample image, to determine a position of the sample face;
   positioning the feature points of the sample face in the sample image; and
   calculating the shape parameter and the facial expression parameter of the sample face based on a positioning result of the feature points of the sample face to obtain the labeled data.

7. The method according to claim 4, wherein obtaining a sample image and labeled data corresponding thereto comprises:
   obtaining the sample image and position label information of the feature points of the sample face; and
   calculating the shape parameter and the facial expression parameter of the sample face based on the position label information of the feature points of the sample face to obtain the labeled data.

8. The method according to claim 4, wherein obtaining a sample image and labeled data corresponding thereto comprises:
   obtaining the labeled data;
   generating a face model of the sample face based on the labeled data;
   rendering the face model, to obtain a face model generation image; and
   obtaining the sample image based on the face model generation image that is rendered.

9. The method according to claim 5, wherein performing face detection on the initial image to identify the target face comprises:
   performing the face detection on the initial image;
   respectively comparing feature information of detected faces with feature information of a preset face stored in a face feature database; and
   determining a first human face in the detected faces that matches the preset face as the target face.

10. The method according to claim 5, wherein performing face detection on the initial image to identify the target face comprises:
    performing the face detection on the initial image; and
    selecting, from detected faces, a second face that satisfies a preset requirement as the target face.

11. The method according to claim 10, wherein the preset requirement comprises that the second face is a face having a largest area among the detected faces.

12. A facial expression driving method, comprising:
    obtaining an image to be processed;
    inputting the image to be processed into a neural network model to obtain a facial expression parameter of a target face in the image to be processed; and
    driving an object to be driven based on the facial expression parameter of the target face,
    wherein the neural network model is used for fitting a face relation below:

$$V=V\_bar+A\_id*a\_id+A\_exp*a\_exp;$$

where V represents coordinates of a first feature point on a face in an input image input into the neural network model, V_bar represents coordinates of a second feature point on an average face, the second feature point corresponds to the first feature point, a_id and a_exp respectively represent a shape parameter and a facial expression parameter of the face in the input image, A_id and A_exp respectively represent a reference shape displacement related to a shape of the face and a reference facial expression displacement related to a facial expression of the face, and V_bar, A_id and A_exp are preset values, and the input image includes the image to be processed.

13. The method according to claim 12, wherein driving an object to be driven based on the facial expression parameter of the target face comprises:
    determining an object facial expression of the object to be driven that matches the facial expression parameter of the target face; and
    presenting the object to be driven having the object facial expression that matches the facial expression parameter of the target face.

14. The method according to claim 12, wherein driving an object to be driven based on the facial expression parameter of the target face comprises:
    determining an object action of the object to be driven that matches the facial expression parameter of the target face; and
    controlling the object to be driven to perform the object action.

15. The method according to claim 12, further comprising:
    receiving a selection instruction input by a user; and
    selecting the object to be driven from one or more predetermined objects based on the selection instruction.

16. A facial expression driving system, comprising a processor and a memory, wherein the memory stores computer program instructions, and the computer program instructions are capable of being executed by the processor for performing:
    obtaining an image to be processed;
    inputting the image to be processed into a neural network model to obtain a facial expression parameter of a target face in the image to be processed; and
    driving an object to be driven based on the facial expression parameter of the target face,
    wherein the neural network model is used for fitting a face relation below:

$$V=V\_bar+A\_id*a\_id+A\_exp*a\_exp;$$

where V represents coordinates of a first feature point on a face in an input image input into the neural network model, V_bar represents coordinates of a second feature point on an average face, the second feature point corresponds to the first feature point, a_id and a_exp respectively represent a shape parameter and a facial expression parameter of the face in the input image, A_id and A_exp respectively represent a reference shape displacement related to a shape of the face and a reference facial expression displacement related to a facial expression of the face, and V_bar, A_id and A_exp are preset values, and the input image includes the image to be processed.

17. The facial expression driving system according to claim 16, wherein an operation of driving an object to be driven based on the facial expression parameter of the target face comprises:
    determining an object facial expression of the object to be driven that matches the facial expression parameter of the target face; and
    presenting the object to be driven having the object facial expression that matches the facial expression parameter of the target face.

18. The facial expression driving system according to claim 16, wherein an operation of driving an object to be driven based on the facial expression parameter of the target face comprises:
    determining an object action of the object to be driven that matches the facial expression parameter of the target face; and
    controlling the object to be driven to perform the object action.

19. The facial expression driving system according to claim 16, wherein the computer program instructions are capable of being executed by the processor for further performing:
    receiving a selection instruction input by a user; and
    selecting the object to be driven from one or more predetermined objects based on the selection instruction.

* * * * *